(12) United States Patent
Muntermann (10) Patent No.: US 8,049,464 B2
(45) Date of Patent: Nov. 1, 2011

(54) RECHARGEABLE BATTERY AND METHOD FOR ITS OPERATION

(76) Inventor: Axel Muntermann, Nauborn (DE)

( * ) Notice: Subject to any disclaimer, the term of this patent is extended or adjusted under 35 U.S.C. 154(b) by 742 days.

(21) Appl. No.: 11/817,964

(22) PCT Filed: Mar. 8, 2006

(86) PCT No.: PCT/EP2006/002130
§ 371 (c)(1),
(2), (4) Date: Apr. 18, 2008

(87) PCT Pub. No.: WO2006/094785
PCT Pub. Date: Sep. 14, 2006

(65) Prior Publication Data
US 2009/0051320 A1  Feb. 26, 2009

(30) Foreign Application Priority Data
Mar. 8, 2005 (DE) .................. 10 2005 011 081

(51) Int. Cl.
*H02J 7/00* (2006.01)
(52) U.S. Cl. .................. 320/128; 320/116; 320/134
(58) Field of Classification Search .................. 320/128, 320/134, 116
See application file for complete search history.

(56) References Cited

U.S. PATENT DOCUMENTS

| | | | |
|---|---|---|---|
| 3,735,234 A | 5/1973 | Godard | |
| 4,764,856 A * | 8/1988 | Rausch | 363/21.17 |
| 4,962,349 A * | 10/1990 | Albach et al. | 323/265 |
| 5,796,238 A * | 8/1998 | Hiratsuka et al. | 320/112 |
| 5,990,663 A | 11/1999 | Mukainakano | |
| 6,025,694 A | 2/2000 | Mercke et al. | |
| 6,118,254 A | 9/2000 | Faulk | |
| 6,735,096 B2 * | 5/2004 | Chang et al. | 363/37 |
| 7,135,838 B2 * | 11/2006 | Young et al. | 320/134 |

FOREIGN PATENT DOCUMENTS
EP  0 621 649 A1  10/1994

OTHER PUBLICATIONS

International Preliminary Examination Report.
Samrat Sen, "Austrailian Patent Application 2006222162 Office Action", Jul. 30, 2009, Publisher: Australian Government IP Austrailia, Published in: AU.
Israel Patent Office, "Israel Office Action for Israel International Application No. 185783", Oct. 20, 2010, Publisher: Israel Patent Office, Published in: IL.

* cited by examiner

Primary Examiner — M'Baye Diao
(74) Attorney, Agent, or Firm — DeMont & Breyer, LLC (57) ABSTRACT

An apparatus and a method are disclosed relating to a rechargeable battery for operation with an external voltage which is applied at least at times to the output of the rechargeable battery and is below the output voltage of the rechargeable battery when in its fully charged state, which has at least one chargeable electrochemical cell, an electrical connection to the output of the rechargeable-battery for inputting and/or outputting electrical energy, a housing which surrounds the at least one chargeable electrochemical cell, and a control circuit for controlling the charging process of the rechargeable battery and/or the production of the rechargeable-battery voltage at the output of the rechargeable battery. The disclosed battery offers better characteristics, in particular for mobile electrical appliances, and is useable in appliances that are designed for use with rechargeable batteries of a different type, in particular with cells with a different cell voltage.

52 Claims, 10 Drawing Sheets

RECHARGEABLE BATTERY AND METHOD FOR ITS OPERATION

The invention relates to rechargeable batteries having at least one chargeable electrochemical cell, in particular rechargeable batteries having a high discharge current for use in medical appliances such as defibrillators, and to a method for charging and discharging of rechargeable batteries.

Rechargeable batteries or rechargeable-battery cells are frequently used to supply power to mobile electrical appliances. Conventional rechargeable-battery types are those such as lead-acid rechargeable batteries which are used, for example, in motor-vehicle batteries or alkaline rechargeable batteries which include, inter alia, nickel-cadmium (NiCd) and nickel-metal-hydride (NiMH) rechargeable batteries.

Nickel-cadmium rechargeable batteries, which have a negative electrode composed of metallic cadmium, have gained major importance and are frequently used as small, gastight encapsulated button cells and round cells, because they require no maintenance, for power supplies in electronic appliances, such as handheld computers, radio receivers, mobile telephones or flash lights.

The known disadvantages of nickel-cadmium cells, which include the so-called memory effect, self-discharge of the cells, small capacity per unit volume and the use of toxic components are only partially avoided by the more advanced nickel-metal-hydride cells. The memory effect and self-discharge, in particular, also occur with nickel-metal-hydride cells.

In contrast, lithium-ion (Li-Ion) rechargeable batteries have considerably better characteristics. This type of rechargeable battery has no memory effect and only a minimal self-discharge. Furthermore, lithium-ion cells have a considerably higher relative density and are therefore considerably lighter in weight.

Conventional lithium-ion cells require a complex electronic protection circuit (protection circuit module; PCM), however, which protects the cells against overcharging and over discharging, as well as against short-circuits, since there is otherwise a risk of the cells being destroyed or exploded. By way of example, EP 0 871 273 A1 describes one protection circuit for lithium-ion cells. The use of a rechargeable battery which is equipped with a protection circuit in principle involves the risk of malfunction, and therefore of unexpected failure. This makes their use in particular in medical appliances, for example in the defibrillators that are used for rescue medicine purposes, problematic, because of the high availability that is required there. Lithium-ion rechargeable batteries have therefore not yet been broadly used in the field of medical appliances, despite their better characteristics.

Furthermore, the difference of voltage of nickel-cadmium and nickel-metal-hydride cells, both of which have a nominal voltage of about 1.25 V, and lithium-ion cells with a nominal voltage of about 3.6 V to 3.7 V represents a further problem in conversion to lithium-ion rechargeable batteries. The problem is that the voltage which is produced by a rechargeable battery is defined in principle by the number of cells connected in series and can accordingly only be a multiple of the cell voltage of the cells that are used so that, in general, the voltage of a lithium-ion rechargeable battery does not match the voltage of the rechargeable battery to be replaced. This poses particular problems when a power supply unit for charging the rechargeable battery is integrated in the appliance, or the aim is to continue to use existing chargers. If a voltage is in this case chosen for the lithium-ion rechargeable battery which is above that of the rechargeable battery to be replaced, then the lithium-ion rechargeable battery will never be fully charged. If, in contrast, a voltage which is below that of the rechargeable battery to be replaced is chosen for the lithium-ion rechargeable battery, this may not ensure correct operation of the appliance.

The invention is therefore based on the object of finding a way in which rechargeable batteries with better characteristics can be produced and used, in particular in mobile electrical appliances. A further object of the invention is to find a way to use rechargeable batteries in appliances which are designed for use with rechargeable batteries of a different type, in particular with cells with a different cell voltage.

This object is achieved in a very highly surprisingly simple manner by a rechargeable battery as claimed in claims 1 and 23, by a method for operation of a rechargeable battery as claimed in claim 14, and by a rechargeable-battery arrangement as claimed in claim 41, a medical appliance as claimed in claim 43, a charger as claimed in claim 50 and use thereof as claimed in one of claims 51 or 52. Advantageous embodiments and developments are described in the respective dependent claims.

In the following text, the expression rechargeable battery means an electrochemical energy store which has one or more chargeable electrochemical cells. A plurality of cells can be connected in parallel and/or in series within the rechargeable battery, matched to the rechargeable-battery voltage and discharge current values required for the respective purpose.

The rechargeable battery according to the invention has at least one chargeable electrochemical cell, an electrical connection to the output of the rechargeable-battery for inputting and/or outputting electrical energy, a housing which surrounds the at least one chargeable electrochemical cell, and a control circuit for controlling the charging process of the rechargeable battery and/or the production of the rechargeable-battery voltage at the output of the rechargeable battery. The control circuit is preferably and expediently arranged within the housing of the rechargeable battery. The rechargeable battery is designed for operation in which an external voltage, for example from a power supply unit, which is below the output voltage of the rechargeable battery in its fully charged state is applied at least at times to the output of the rechargeable battery. The control circuit is accordingly advantageously designed to monitor whether the external voltage is applied, and to control the charging process of the rechargeable battery and/or the production of the rechargeable-battery voltage at the output of the rechargeable battery as a function of this. The external voltage which is applied to the output of the rechargeable battery at times is in this case produced in particular by a power supply unit which is connected to an electrical power supply system at times and which, for example, is integrated in the electrical appliance to be supplied by the rechargeable battery.

For electrical appliances which were previously operated, for example, using nickel-cadmium or nickel-metal-hydride rechargeable batteries with a rechargeable-battery voltage of, for example, 10 V and are equipped with an integrated charging device for charging the rechargeable batteries, the invention allows the use of a lithium-ion rechargeable battery with a high rechargeable-battery voltage, by means of the integrated control circuit, in a manner which ensures the charging function without having to make any changes to the appliance itself.

In order to produce the rechargeable-battery voltage at the output of the rechargeable battery, the control circuit advantageously has an appropriate controllable switch, by means of which the rechargeable-battery voltage can be connected to the output or can be disconnected from it. In order to charge the rechargeable battery, the control circuit advantageously also has a controllable charging circuit, which preferably has a voltage converter, in order to convert the external voltage to a higher voltage, which is suitable for charging the rechargeable battery.

The expression rechargeable-battery voltage refers to the voltage which is produced by the at least one electrochemical cell of the rechargeable battery and can be selectively produced at the output of the rechargeable battery, by means of the controllable switch.

In order to monitor the voltage at the output of the rechargeable battery, the control circuit preferably has at least one comparator which is designed to compare the voltage at the output of the rechargeable battery with a reference voltage. In particular, it is also possible to provide two comparators, with the first comparator responding when the monitored voltage is below a reference voltage, and with the second comparator responding when the monitored voltage is above a reference voltage.

Since the process of charging the rechargeable battery and/or the production of the rechargeable-battery voltage of the output of the rechargeable battery are/is controlled by the control circuit as a function of whether the external voltage is present, the at least one comparator is preferably designed to drive the controllable switch and/or the controllable charging circuit.

In particular, the control circuit is advantageously designed to produce the rechargeable-battery voltage at the output of the rechargeable battery on identification of a voltage at the output of the rechargeable battery which is below a reference voltage, and to interrupt the process of charging the rechargeable battery by the charging circuit. In a corresponding manner, the control circuit is advantageously designed to disconnect the rechargeable-battery voltage from the output of the rechargeable battery on identification of a voltage at the output of the recharging battery which is above the reference voltage, and to carry out the process of charging the rechargeable battery by means of the charging circuit.

In one preferred embodiment to the invention, the control circuit has at least one timer which is connected between the at least one comparator and the controllable switch and/or the controllable charging circuit, and that is designed to delay the control signal for the comparator by a predetermined delay time.

Particularly on identification of a voltage at the output of the rechargeable battery above the reference voltage, that control signal of the comparator which is used to disconnect the rechargeable-battery voltage from the output of the rechargeable battery and in particular drives the controllable switch which is provided for this purpose is delayed by a predetermined delay time by means of an appropriate timer. This means that the rechargeable-battery voltage is disconnected from the output of the rechargeable battery at cyclic intervals in order to check whether the external voltage, which is below the rechargeable-battery voltage is being applied to the output.

The process of charging the rechargeable battery and activation of the charging circuit is preferably delayed by a second predetermined delay time by a second timer, with this delay time preferably being set such that the charging process is not started before identification of an external voltage is present at the output. The presence of an external voltage at the output is identified by a voltage at the output of the rechargeable battery not being identified as being below the reference voltage when the rechargeable-battery voltage is disconnected from the output of the rechargeable battery.

In order to ensure that a load that is connected to the output of the rechargeable battery is supplied when the rechargeable-battery voltage is disconnected from the output of the rechargeable battery and the external voltage is not being applied, the control circuit advantageously has an energy store for storage of electrical energy, which energy store is, in particular, in the form of a capacitor.

The described control circuit according to the invention can in general be used in a particularly advantageous manner to operate a rechargeable battery in an electrical appliance which is connected to a voltage supply at least at times, with the voltage supply, when in the connected state, being used both to operate the electrical appliance and to charge the rechargeable battery, but with the electrical appliance producing only a voltage for charging the rechargeable battery, which voltage is at least below the maximum charging voltage of the rechargeable battery. This application occurs in particular when a new type of rechargeable battery with a high voltage is intended to be used in an existing electrical appliance.

Furthermore, the requirements for the voltage and capacity of the rechargeable battery may differ, depending on the purpose. The rechargeable battery according to the invention therefore advantageously has at least two series-connected and/or at least two parallel-connected cells. The scope of the invention also includes, of course, any other number of series-connected and/or parallel-connected rechargeable-battery cells.

A method according to the invention for operation of a rechargeable battery with a rechargeable-battery voltage which can be produced switchably at the output of the rechargeable battery, and with an external voltage which is applied at least at times to the output of the rechargeable battery and is below the rechargeable-battery voltage when the rechargeable battery is fully charged, comprising the voltage at the output of the rechargeable battery being monitored, the rechargeable-battery voltage being produced at the output of the rechargeable battery as a function of the monitored voltage, and the rechargeable battery being charged by the external voltage, which is applied to the output of the rechargeable battery, as a function of the monitored voltage. The external voltage which is applied to the output of the rechargeable battery at times is produced, for example, by a power supply unit which is connected to an electrical power supply system at times.

The process of monitoring the voltage at the output of the rechargeable battery advantageously comprises comparison with a predetermined reference voltage.

The method preferably provides that the rechargeable-battery voltage is produced at the output of the rechargeable battery, and the charging of the rechargeable battery is interrupted when the monitored voltage falls below a predetermined reference value. This is typically the case when the external voltage is disconnected from the output of the rechargeable battery.

If the external voltage is now once again applied to the output of the rechargeable battery, it problematic to identify when the rechargeable-battery voltage has a higher value than the external voltage, since the voltage level at the output does not change during this process.

It is therefore advantageous, in order to check whether the external voltage is present at the output of the rechargeable battery, for the rechargeable-battery voltage to be disconnected from the output of the rechargeable battery at cyclic time intervals. Once the rechargeable-battery voltage has been disconnected from the output of the rechargeable battery, the rechargeable battery is preferably charged only if the monitored voltage has been identified as being above a predetermined reference value or an applied external voltage over a predetermined time period. The predetermined voltage reference value is accordingly preferably below the voltage value of the external voltage.

Since the external voltage is at least below the maximum charging voltage of the rechargeable battery, the method advantageously provides for the process of charging the rechargeable battery by means of the external voltage which is applied to the output of the rechargeable battery to comprise the conversion of a voltage.

The method furthermore provides for electrical energy which is produced in particular by the rechargeable battery to be stored in an energy store, in particular a capacitor.

When using at least two rechargeable batteries, in particular at least one first rechargeable battery and at least one second rechargeable battery, a further embodiment to the method provides for switching to take place automatically from the at least first rechargeable battery to the at least second rechargeable battery.

Furthermore, the inventor has surprisingly found that rechargeable batteries based on certain lithium-ion cells can be operated without the protection circuit that is otherwise required for lithium-ion cells.

The object is accordingly furthermore achieved by a rechargeable battery which has at least one lithium-ion cell, an electrical connection for inputting and/or outputting electrical energy, a housing which surrounds the at least one lithium-ion cell, and a communication interface for communication between the rechargeable battery and a load to be supplied, with the communication interface being matched to the characteristics of the lithium-ion cell, and with the lithium-ion cell being designed to be operated without a protection circuit.

The invention therefore provides a rechargeable battery based on lithium-ion cells which can be operated without a protection circuit for protecting the cells against overcharging, over discharging and short-circuiting. For example, the communication interface can preferably be designed to support the Smart Battery System (SBS) with the record data to be interchanged with the electrical appliance to be supplied being matched to the characteristics of the lithium-ion cells which are used and can be operated without a protections circuit.

The method described above for operation of a rechargeable battery can, of course, also be carried out with this rechargeable battery and with the preferred embodiments of the rechargeable battery such as this as described in the following text.

At least one electrode of the lithium-ion cell is preferably composed of manganese. The positive electrode of the lithium-ion cell particularly advantageously has a nickel/manganese mixture. The use of these materials significantly improves the characteristics of the cell in terms of overcharging, over discharging and short-circuiting.

Furthermore, the lithium-ion cell is advantageously in the form of a lithium polymer cell. Rechargeable battery cells based on polymer, for example with a solid or gel-like polymer electrolyte layer, allow the manufacture of thin film batteries and therefore an advantageous shape for installation in transportable appliances.

The lithium-ion cell advantageously has a maximum voltage of about 4.2 V and a nominal voltage of about 3.7 V. Any desired number of lithium-ion cells may, of course, be interconnected in series and/or in parallel within the rechargeable battery in order to match the rechargeable battery to different applications.

A rechargeable battery according to the invention accordingly advantageously has at least two series-connected and/or at least two parallel-connected lithium-ion cells.

The at least one lithium-ion cell particularly preferably complies with the UL 1642 safety standard. Particularly when the lithium-ion cell complies with this safety standard, there is no need for an integrated protection circuit in the rechargeable battery.

In order to use the rechargeable battery for supplying mobile electrical appliances, in particular in the outdoor area, the rechargeable battery must also be operable at low temperatures. The at least one lithium-ion cell is accordingly preferably suitable for discharging in an operating temperature range from at least 0° to 40° C., in particular −10° to 50° C., in particular −20° to 60° C. The lithium-ion cell is analogously advantageously suitable for charging in an operating temperature range from at least 10° to 40° C., in particular 5° to 45° C., in particular 0° to 50° C.

In order to use the rechargeable battery in vehicles, in particular vehicles which are subject to severe vibration, such as helicopters or aircraft, the lithium-ion cell is preferably resistant to vibration in accordance with EN 1789.

Furthermore, the lithium-ion cell has an initial capacity of preferably at least 1400 mAh, in particular at least 1600 mAh, in particular at least 1800 mAh, and in particular at least 2000 mAh, in order to ensure that the rechargeable battery has an adequate operating life.

The lithium-ion cell preferably retains a high percentage of its initial capacity over a large number of charging and discharge cycles, in order to ensure that the rechargeable battery has a long life. The lithium-ion cell accordingly and advantageously has a capacity of at least 60%, in particular 70%, and in particular 80% of the initial capacity after about 500 charging cycles with an average discharge current of 1.5 A and with the rechargeable battery being discharged to about 3 V. Furthermore the lithium-ion cell advantageously has a capacity of at least 40%, in particular 50%, and in particular 60% of the initial capacity after about 500 charging cycles with an average discharge current of 4.5 A and with the rechargeable battery being discharged to about 3 V.

In order to supply electrical appliances that draw heavy currents, such as defibrillators, the lithium-ion cell has a maximum discharge current of at least 10 A, in particular 30 A, and in particular 50 A.

Furthermore, the invention provides a rechargeable-battery arrangement which has at least one first and one second rechargeable battery as described above, as well as a connection for inputting and/or outputting electrical energy, and an electronics assembly which is designed to discharge the second rechargeable battery during discharging of the rechargeable-battery arrangement only when the first rechargeable battery has been completely discharged. This results in the second rechargeable battery having a considerably longer life since, typically, it carries out fewer charge cycles than the first rechargeable battery. This considerably increases the overall availability of the appliance in which the rechargeable-battery arrangement is used.

The rechargeable battery according to the invention can be used particularly advantageously in electrical appliances which require a high discharge current and high availability. The invention therefore furthermore covers a medical appliance, in particular having a device for monitoring the heart functions and/or a defibrillator, which has a rechargeable battery and/or a rechargeable battery arrangement as described above. A medical appliance according to the invention advantageously has an integrated power supply unit which can be connected to an electrical power supply system.

In a further embodiment, the rechargeable battery according to the invention may itself have at least one power supply unit. The power supply unit is preferably integrated in or arranged on the housing of the rechargeable battery.

The invention furthermore provides a charger which is designed to charge a rechargeable battery as described above.

The rechargeable battery as described above and based on the lithium ion cells, and the corresponding rechargeably battery arrangement, have a range of advantageous characteristics over conventional rechargeable batteries. These include more mechanical robustness, the capability to operate over a wider temperature range, increased storage capability, a longer operating life, and a high constant discharge current.

A rechargeable battery and/or rechargeable battery arrangement according to the invention is accordingly particularly advantageously suitable for use in a medical appliance which, in particular has a device for monitoring the heart functions and/or a defibrillator. The use of a rechargeable battery according to the invention for example in a defibrillator/monitor system of the LifePak 12 type from Medtronic Company allows the operating time to be increased from about 2.5 h at the moment when using a nickel/cadmium rechargeable battery to about 5.5 h when using a 3s3p rechargeable battery according to the invention (3s3p: three lithium cells connected in series and three connected in parallel), and to about 11 h when using a rechargeable-battery arrangement having two rechargeable batteries.

When using at least two rechargeable batteries, in particular at least one first rechargeable battery and at least one second rechargeable battery, one embodiment of the medical appliance has means for detection of the rechargeable-battery voltage and/or means for automatically switching from at least one first rechargeable battery to at least one second rechargeable battery. By way of example, the first rechargeable battery is used for general operation of the medical appliance, and the second as a standby or emergency rechargeable battery. The emergency rechargeable battery is used only when the first rechargeable battery is no longer producing sufficient power for operation of the medical appliance. If the first rechargeable battery is not able to produce the required power, for example because it has already been used and is no longer sufficiently charged, switching automatically takes place, according to the invention, to the second rechargeable battery. A user of the medical appliance need no longer first of all check the state of the first rechargeable battery or even manually change over or manually switch to the second rechargeable battery. In the case of a time-critical reanimation which requires the use of a defibrillator, for example, valuable time can therefore be saved by automatically switching to the charged rechargeable battery.

In one embodiment, the means for automatically switching from the at least first rechargeable battery to the at least second rechargeable battery may also be included in the rechargeable-battery arrangement according to the invention itself.

In order to allow easier finding and/or identification of the rechargeable battery, of the rechargeable-battery arrangement, of the medical appliance and/or of the charger, a signal color or a color which can be perceived clearly by the human eye is preferably applied to the devices specified above. In order to allow them to be found and identified when it is dark as well, the applied color may be a fluorescent color whose components include appropriate fluorescent substances.

As an alternative or in addition, the device mentioned in the previous paragraph may have at least one light source, for example an LED. The light source may in this case transmit light continuously or, in order to enhance the signal effect, may transmit the light in the form of short, preferably periodic, light pulses or blinking.

As a further alternative or a further addition to the embodiments described above, the devices mentioned may have at least one sound source. The sound source may in this case emit sound continuously, in particular at least one tone, or may emit the sound in the form of short, preferably periodic, sound pulses, in order to enhance the signaling affect. In one embodiment, the sound source that has been mentioned also has means for detection of an acoustic signal, preferably a tone sequence. The sound source starts to transmit only after detection of this acoustic signal which, for example, is transmitted by a user of the medical appliance.

The light source and/or the sound source have/has in particular at least one dedicated rechargeable battery for power supply purposes, which, for example, can also be charged using the charging process according to the invention.

As a result of the advantageous characteristics, use of a medical appliance as described above in a rescue vehicle, in particular a rescue truck or rescue helicopter, is likewise also within the scope of the invention.

Furthermore, a medical appliance according to the invention can, for example, advantageously be used in public facilities, in off-shore facilities, in sports stadiums, in train stations or at airfields. The greater temperature range at which a medical appliance can be operated with a rechargeable battery according to the invention is particularly important for application options such as these.

Since the rechargeable battery according to the invention can be stored for a long time, it is also advantageous to use it in defibrillator and/or monitor apparatuses which, for example, are installed for emergencies in sports stadiums or train stations and are conventionally equipped with non-rechargeable batteries, for example dry-cell batteries.

The invention will be described in more detail in the following text using preferred embodiments and with reference to the attached drawings. In this case, the same reference symbols denote identical or similar parts in the drawings.

In the figures:

FIG. 1.*a* shows, schematically a control circuit for controlling the charging and discharging of a rechargeable battery according to the invention for operation with an external voltage which is present at least at times at the output of the rechargeable battery, FIG. 1.*b* shows a control circuit for controlling the charging of a rechargeable battery according to the invention during operation with an external voltage which is present at least at times at the output of the rechargeable battery, FIG. 1.*c* shows an upgraded embodiment of the control circuit shown in FIG. 1.*b*.

Figure 1:
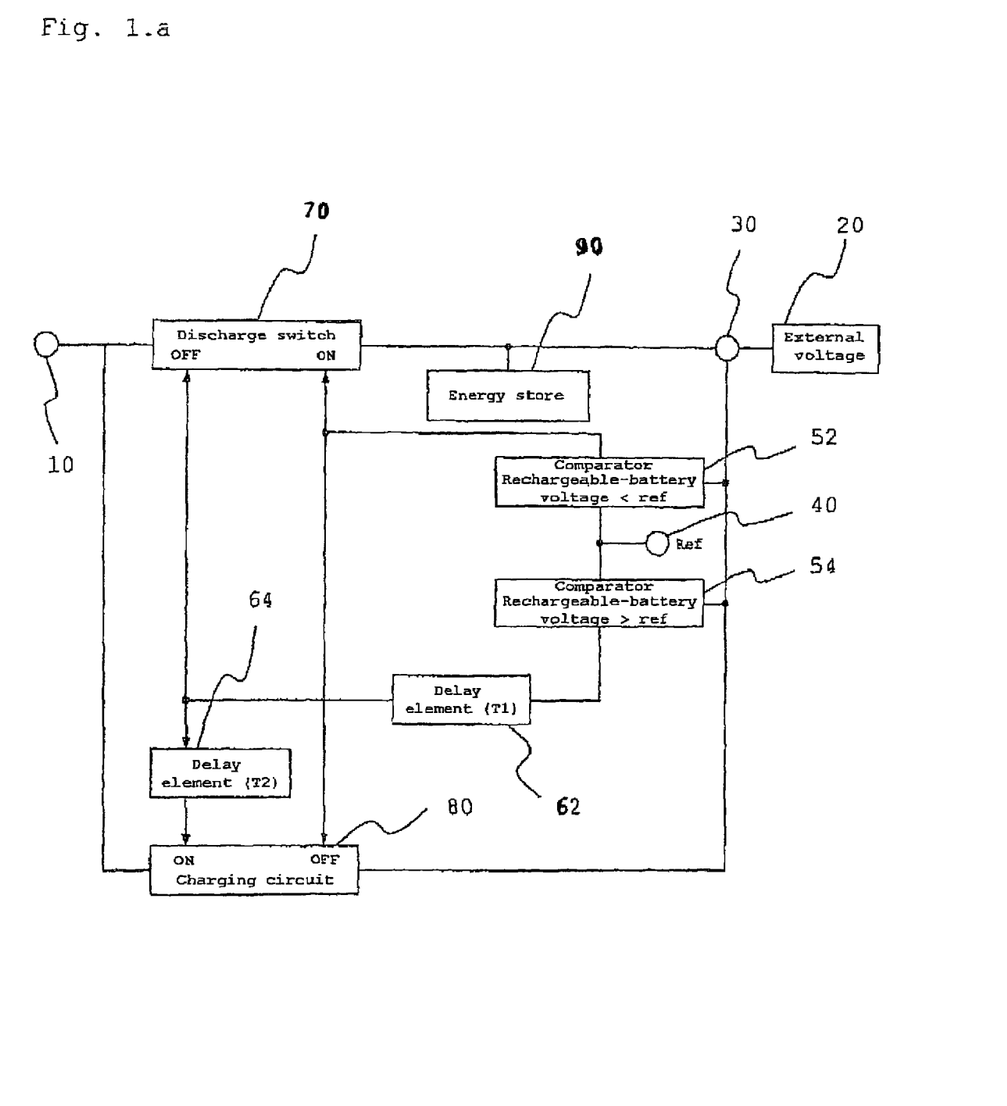

FIG. 1.a shows a schematic block diagram of a control circuit for controlling the charging and discharging of a rechargeable battery according to the invention during operation with an external voltage 20 which is applied to the output 30 of the rechargeable battery at least at times and is lower than the rechargeable-battery voltage 10, at least when the rechargeable battery is fully charged.

The control circuit illustrated in FIG. 1.a is described in the following text in conjunction with the associated functional diagram illustrated in FIG. 2. The functional diagram in FIG. 2 shows the external voltage 220, the voltage 210 at the output of the rechargeable battery, and the respective switching states 230 and 240 of the discharge switch 70 and of the charging circuit 80 as a function of time.

Figure 2:
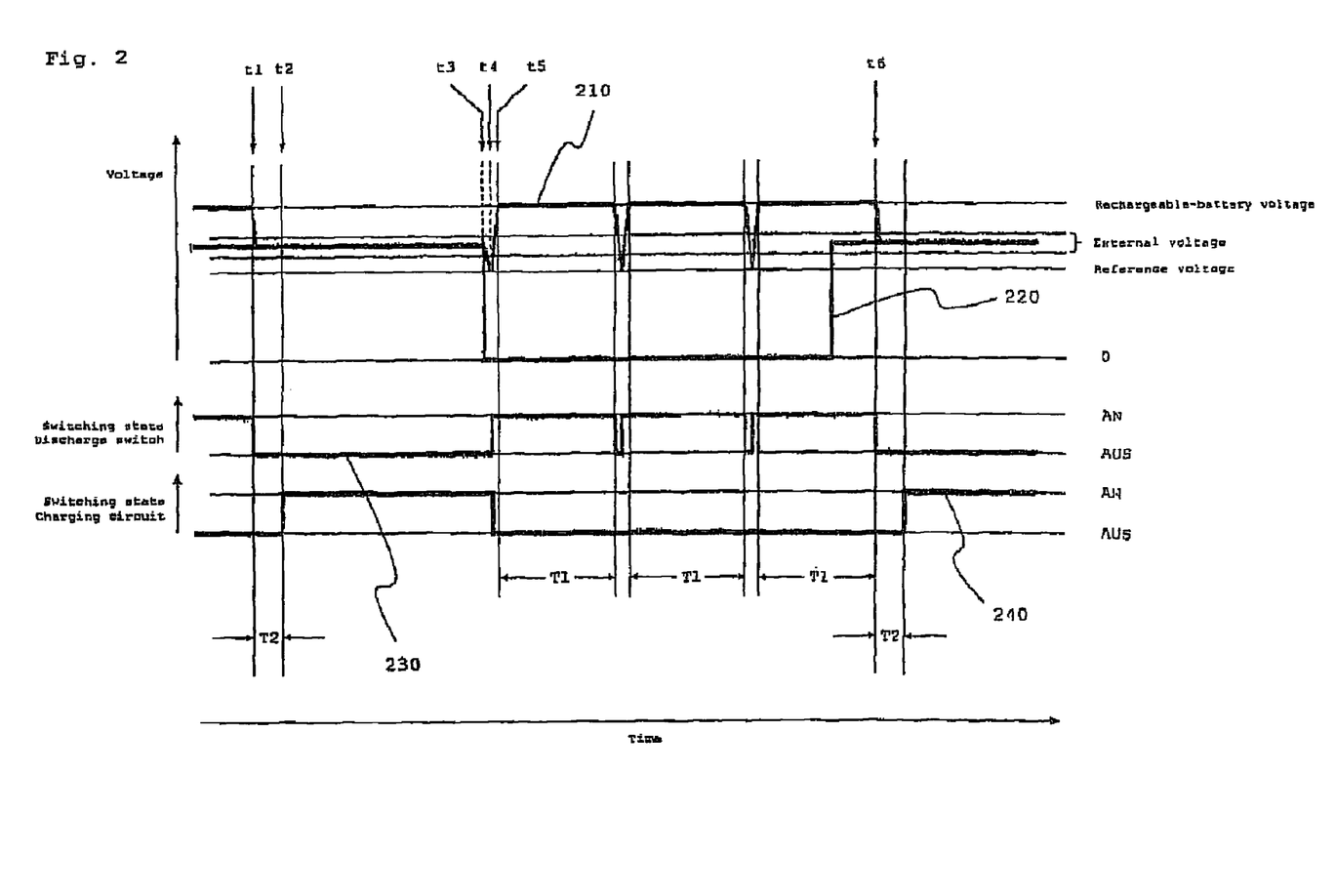
FIG. 2 shows a schematic functional diagram of the control circuit illustrated in FIG. 1.*a*.

At the starting time for the functional diagram illustrated in FIG. 2, the discharge switch is in the switching state ON, that is to say the rechargeable-battery voltage 10 is produced at the output 30 and therefore corresponds to the output voltage 210. At this time, the charging circuit is in the switching state OFF, that is to say the rechargeable battery is not being charged. Furthermore, the external voltage 20 is present at the output 30, illustrated in FIG. 2 by the voltage profile 220 of the external voltage. FIG. 2 illustrates a nominal range for the external voltage.

The reference voltage 40, which is lower than the external voltage 20, is likewise also illustrated by a corresponding line in FIG. 2. At the starting time, the voltage at the output is above the reference voltage. The comparator 54 has already responded to this state at a time before the starting time, and has generated a control signal. This control signal has been delayed by the time T1 by the delay element 62 and, in this example, has been passed on at the time t1. The control signal switches the discharge switch 70 to the switching state OFF, as a result of which the external voltage 20 is present at the output 30. A second delay element 64 delays the control signal comparator 54 by a further delay time T2 and passes it to the charging circuit 80 at the time t2, switching it to the switching state ON, in order to charge the rechargeable battery by means of the applied external voltage 20.

When, as at the time t3 in this example, the external voltage 20 is switched off and falls to zero, any drop in the voltage at the output is buffered by an energy store 90 which, for example, is in the form of a capacitor. Nevertheless, at the time t4, the voltage 210 at the output 30 falls below the reference voltage 40. In consequence the comparator 52 responds and switches the discharge switch 70 without any delay to the switching state ON, and the charging circuit to the switching state OFF. The rechargeable-battery voltage 10 is therefore produced once again at the output 30 at the time t5.

As soon as the output voltage 210 is above the reference voltage 40 again, the comparator 54 responds and switches the discharge switch 70 to the switching state OFF after the delay time T1, as a result of which the voltage at the output 30 falls again. However, as long as the external voltage 220 is at zero or below the reference voltage 40, the output voltage once again falls below the reference voltage 40 and the comparator 52 is once again switched, to be precise before the delay time T2 has elapsed, with the charging process of the rechargeable battery therefore not being started.

However, when the external voltage 20 is present at the output 30 again, while the comparator 52 has switched the discharge switch 70 to the switching state OFF at the time t6, then the output voltage 210 is not below the reference voltage 40 and the charging process is resumed after the delay time T2.

FIG. 1.b shows, schematically, a further control circuit in particular for charging a rechargeable battery according to the invention. The control circuit has an integrated circuit 925 for monitoring the voltage during the charging process. The illustrated circuit 925 has, for example, two channels, of which only one, the upper channel in the figure, is used. For this purpose, the rechargeable battery 102 or at least one cell of the rechargeable battery 102 is connected to a power supply unit 980. The voltage applied from the power supply unit 980, or the external voltage 20, is reduced by means of the resistors 901, 902 and 903, or R1, R2 and R3, which act as a voltage divider to an order of magnitude that is adapted for a comparator 910.

The comparator 910 compares the reduced voltage with a reference or comparison voltage 920 which, for example as in the present case, has a value of about 1.3 V. As long as the reduced voltage is less than the comparison voltage 920, the output of the circuit 925 is switched to "high" by means of an amplifying inverter 930 and a MOS FET 941. In consequence, a transistor 950 is switched on by means of the base resistance of the resistor 904 or R4, thus switching a relay 960. In detail, the transistor 950 causes the coil 960 that is associated with the relay 960 to respond, and the line 915 between the power supply unit 980 and the cells in the rechargeable battery 102 is closed by means of the relay 960. The operating voltage is now applied not only to the relay contact 960 but also to those cells in the rechargeable battery 102 to be charged.

The operating voltage is preferably about 12.25 V. If the voltage rises to a value of more than 12.25 V, this is detected by the resistors R1, R2 and R3, which act as a voltage divider, and the output of the circuit 928 is switched to "low", so that the relay 960 switches and the line 915 and therefore the charging process, are interrupted. This prevents any damage to the cells in the rechargeable battery 102 resulting from an excessive operating voltage.

The resistor 905 or R5, which is connected to the MOSFET 941 and to the line 915, together with the diode 970 forms a protection circuit for the illustrated integrated circuit 925 and/or the entire illustrated system. The diode 970 is preferably a so-called zener diode or Z diode operated in the reverse-biased direction. The diode 970 is chosen such that its zener voltage is matched to the critical voltage of the system or of the circuit 925. As soon as the operating voltage exceeds a voltage level which would damage the circuit 925 or the system, the resistance of the diode 970 is greatly reduced, carrying the operating voltage from the power supply unit 980 via the resistor R5 to ground potential, and therefore protecting the circuit against possible damage. In one preferred embodiment, the zener diode has a zener voltage of about 15 V.

FIG. 1.c shows a further embodiment of the control circuit according to the invention. The circuit corresponds to the circuit shown in FIG. 1.b and has a resistor 906 or R6 and a diode 971 added to it which are arranged in parallel with the relay 960. The power supply unit 980 or a connected defibrillator can also determine whether the rechargeable battery 102 is connected, even when the switch, in this case the relay 960, is open, by means of the diode 971. Instead of the relay 960 illustrated in FIGS. 1.b and 1.c, it is also possible to use some other component with a suitable function for producing the connection between the power supply unit 980 and the rechargeable battery 102, such as a MOSFET.

Figure 3:
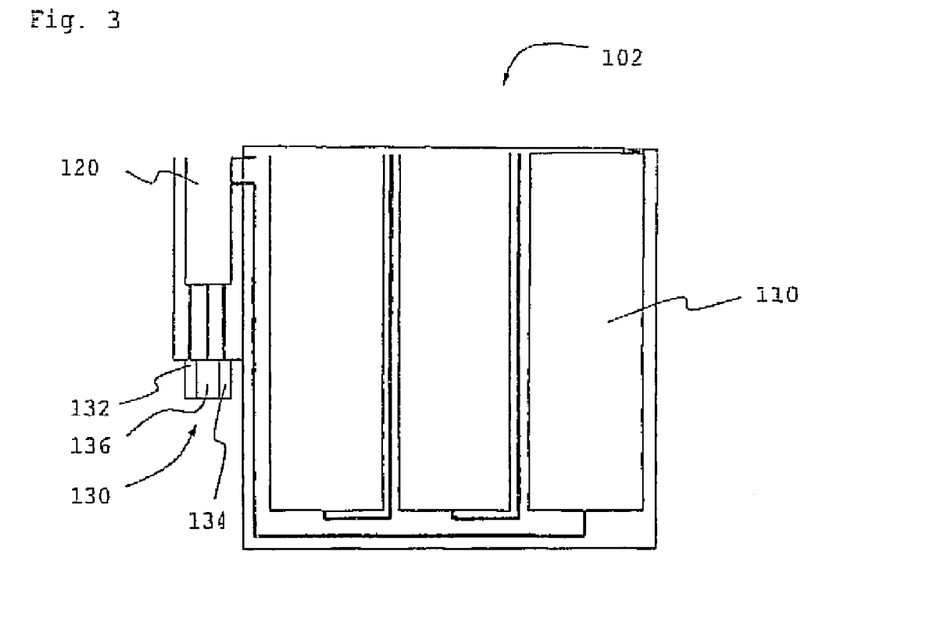
FIG. 3 shows a schematic illustration of a first embodiment of a rechargeable battery according to the invention.
Figure 4:
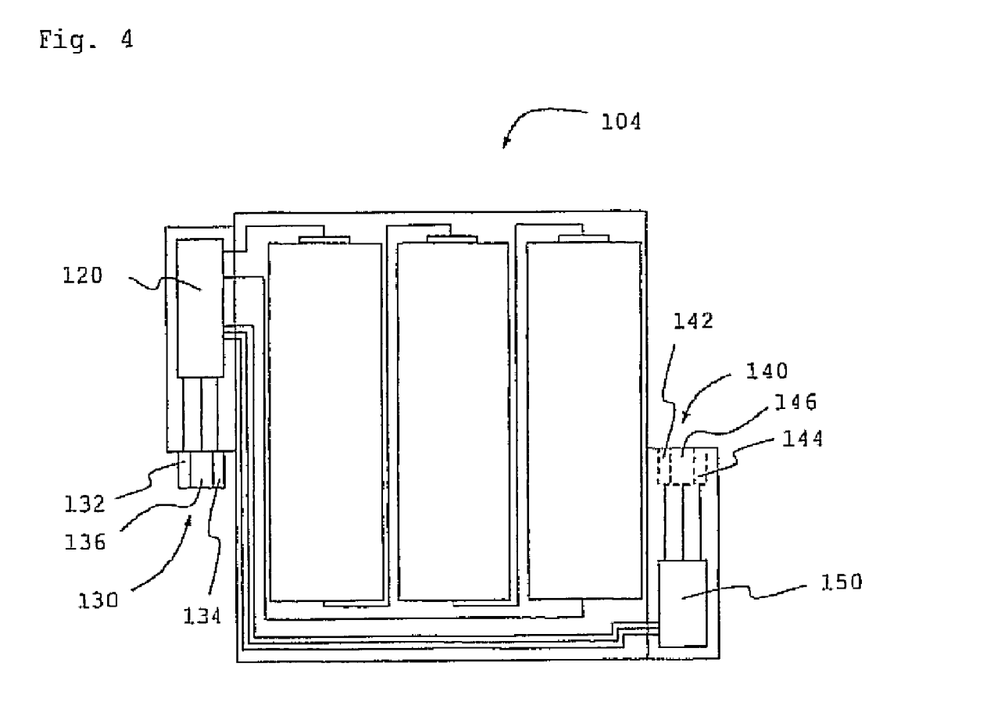
FIG. 4 shows a schematic illustration of a second embodiment of a rechargeable battery according to the invention, which is designed for interconnection of a plurality of rechargeable batteries.
Figure 5:
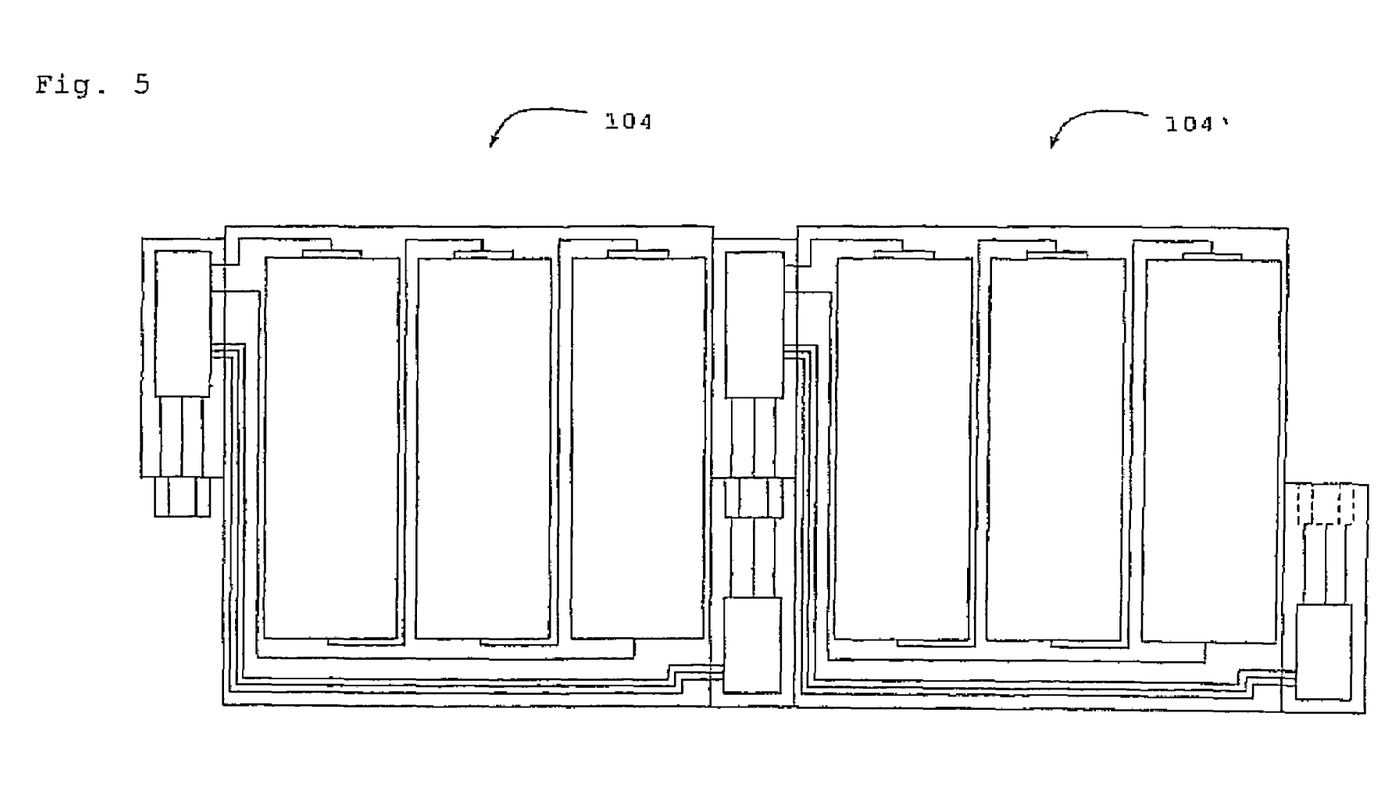
FIG. 5 shows a schematic illustration of two interconnected rechargeable batteries.

FIG. 3 shows a schematic illustration of a first embodiment of a rechargeable battery 102 according to the invention which has three series-connected lithium-ion cells 110 based on manganese. In order to increase the capacity of the rechargeable battery, three cells are furthermore advantageously each connected in parallel, although this is not illustrated in FIG. 3. In this exemplary embodiment, the rechargeable battery has an electronics assembly 120 which is used to communicate with the electrical appliance to be supplied. The electronics assembly 120 can further advantageously have a control circuit as described above. The connecting plug 130 of the rechargeable battery 102 has connecting contacts 132 and 134 for inputting or outputting electrical energy, as well as a communication interface 136 for uni-directional or bi-directional interchange of record data. This allows individual information items associated with the rechargeable battery 102 to be called up and/or to be stored in a memory in the electronics assembly 120. The communication interface and the record data interchanged are matched to the characteristics of the lithium-ion cells being used, which can be operated without a protection circuit. FIG. 4 shows a schematic illustration of a second embodiment for a rechargeable battery 104 according to the invention, which is designed for interconnection of a plurality of rechargeable batteries. For this purpose, the rechargeable battery 104 additionally has a connecting socket 140, comprising connecting contacts 142 and 144 for inputting or outputting electrical energy, as well as a communication interface 146 for uni-directional or bi-directional interchange of data. The connecting socket 140 is also designed to hold a connecting plug 130. This allows at least two identical rechargeable batteries 104 to be interconnected to form one. The rechargeable battery 104 additionally has a further electronics assembly 150. The assemblies 120 and 150 are jointly designed to be discharged and/or charged in a cascaded form, with the rechargeable batteries interconnected. For example, when two rechargeable batteries 104 and 104' are interconnected, as illustrated in FIG. 5, the assemblies 120 and 150 are each designed to discharge the rechargeable battery 104' when discharging via the connection of the rechargeable battery 104, only when the rechargeable battery 104 has already been completely discharged.

Figure 6:
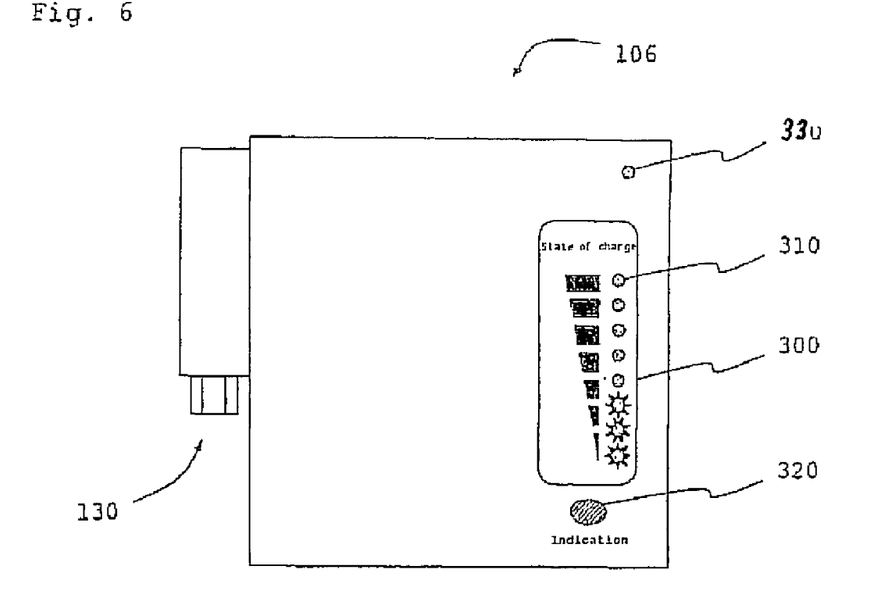
FIG. 6 shows a schematic illustration of a third embodiment of a rechargeable battery according to the invention, which has a wear indication.

FIG. 6 shows a further advantageous embodiment of a rechargeable battery according to the invention which has a state of charge indication 300 which, in this exemplary embodiment, indicates the instantaneous state of charge of the rechargeable battery by means of light-emitting diodes 310. The indication can optionally be activated as required via a push-button switch 320. In addition to the indication of the instantaneous state of charge of the rechargeable battery, a further light-emitting diode 330 is provided in this exemplary embodiment as a wear indication which, for example, indicates that the rechargeable battery has reached a predetermined number of charging cycles. A plurality of light-emitting diodes can also be provided for the wear indication, and are activated as a function of the number of charging cycles already carried out. Any other suitable type of visual or non-visual indication of the state of charge and/or of the charging cycles of the rechargeable battery is, of course, also within the scope of the invention.

FIGS. 7 to 13 show various characteristics of lithium-ion cells based on manganese, which are preferably used in a rechargeable battery according to the invention.

Figure 7:
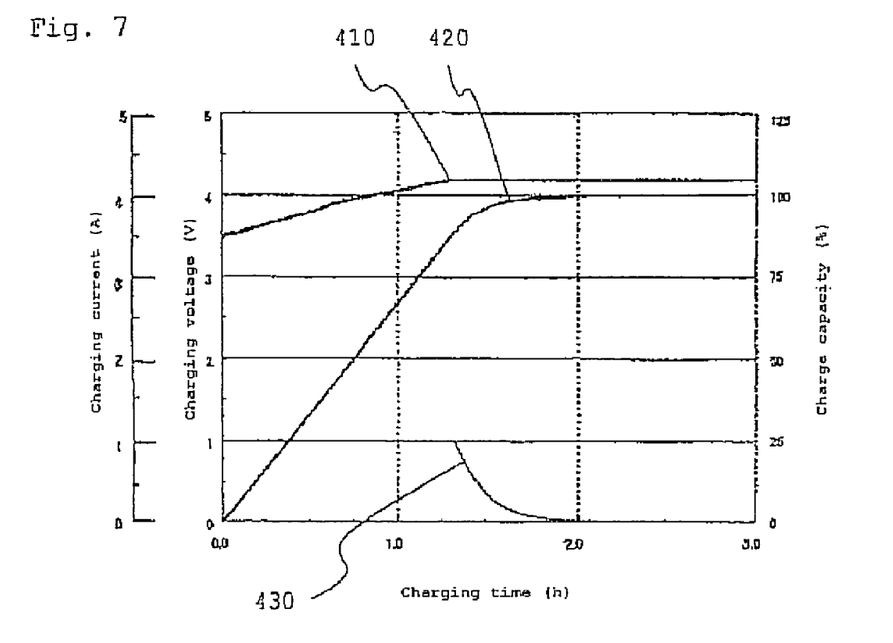
FIG. 7 shows, schematically, a diagram of the charging characteristic of a lithium-ion cell which is preferably used in a rechargeable battery according to the invention.

FIG. 7 shows, schematically, a diagram of the charging characteristic of a lithium-ion cell. The illustration shows the charging voltage 410, the charge capacity 420 and the charging current 430.

Figure 8:
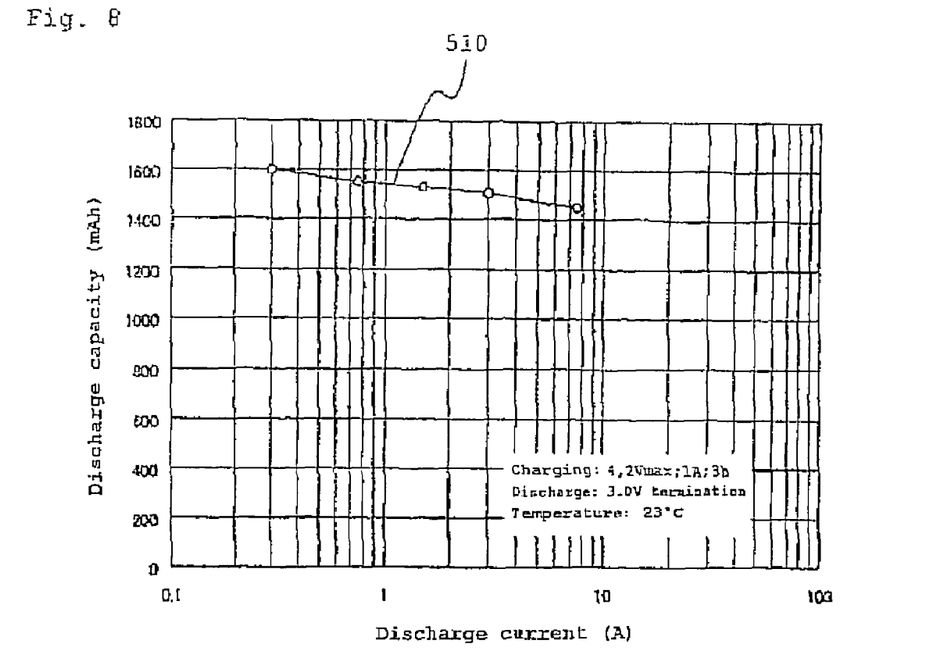
FIG. 8 shows, schematically, a diagram of the discharge capacity as a function of the discharge current of a lithium-ion cell which is preferably used in a rechargeable battery according to the invention.

FIG. 8 shows, schematically, a diagram of the discharge capacity 510 as a function of the discharge current of the lithium-ion cell at a temperature of 23° C., with the cell having been charged at a voltage of 4.2 V and with a charging current of 1 A for 3 h and with the discharge process being terminated at 3.0 V.

Figure 9:
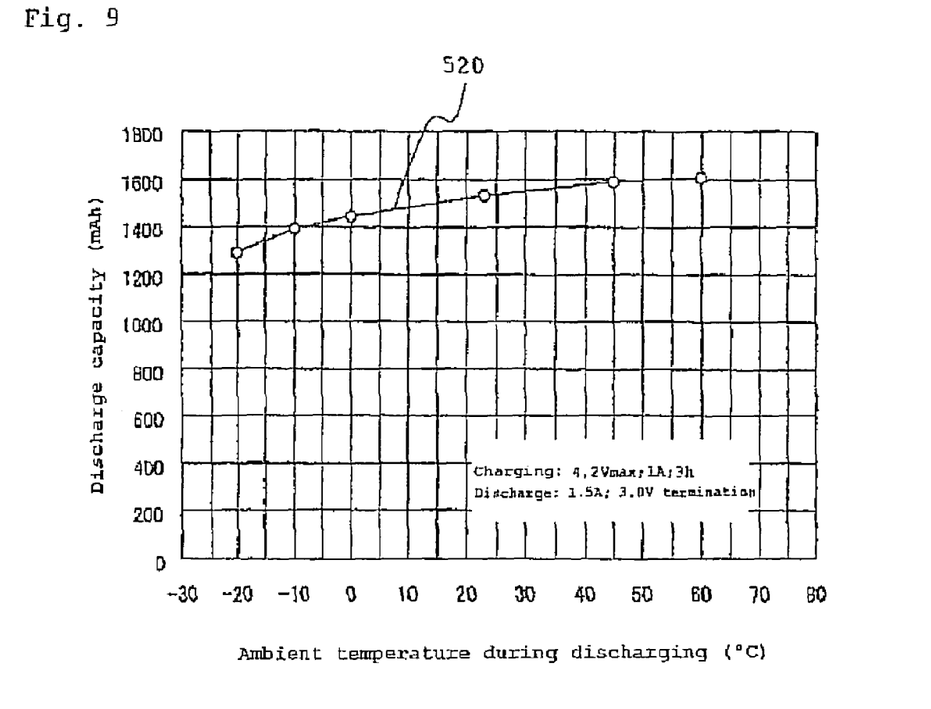
FIG. 9 shows, schematically, a diagram of the discharge capacity as a function of the temperature of a lithium-ion cell which is preferably used in a rechargeable battery according to the invention.

FIG. 9 shows, schematically, a diagram of the discharge capacity 520 as a function of the temperature of the lithium-ion cell with the cell having been charged at a voltage of 4.2 V and with a charging current of 1 A for 3 h, and with the discharge process having been carried out at a discharge current of 1.5 A, and having been terminated at 3.0 V.

Figure 10:
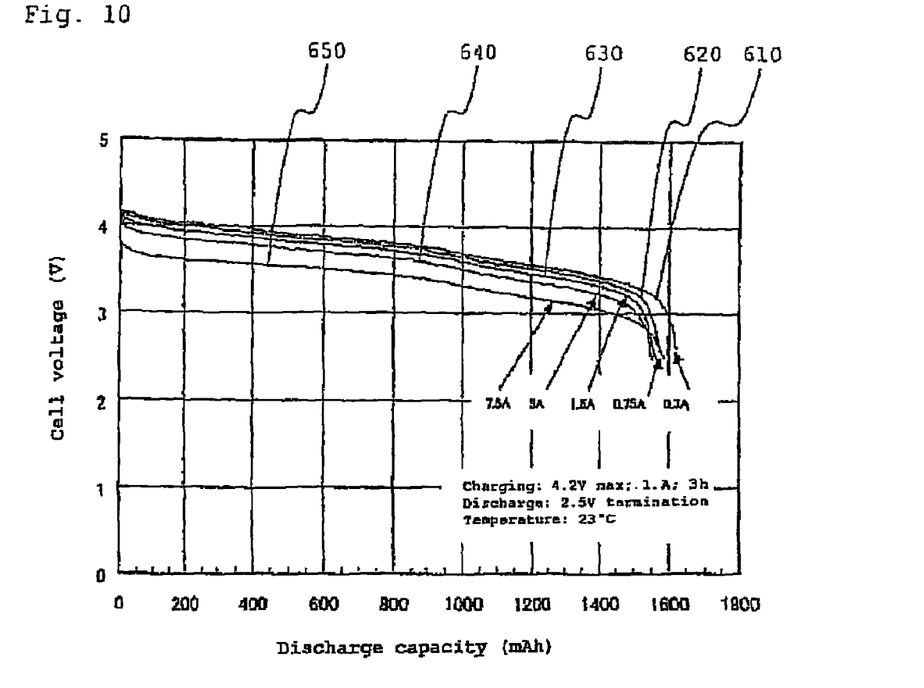
FIG. 10 shows, schematically, a diagram of discharge curves for different discharge currents for a lithium-ion cell which is preferably used in a rechargeable battery according to the invention.

FIG. 10 shows, schematically, a diagram with discharge curves 610, 620, 630, 640 and 650 for the lithium-ion cell with different discharge currents.

Figure 11:
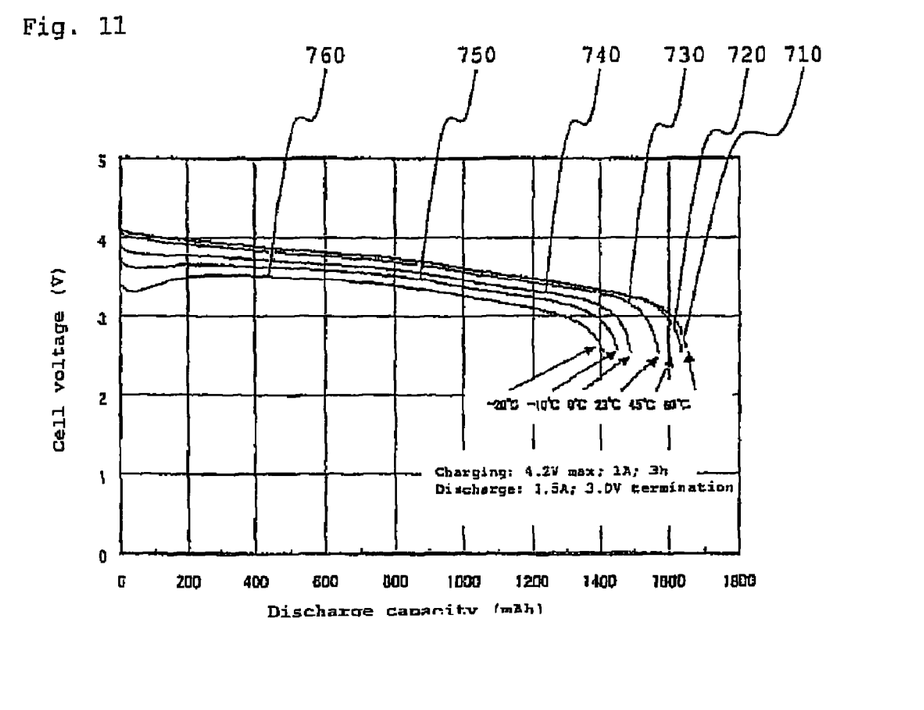
FIG. 11 shows, schematically, a diagram of the discharge curves for different temperatures for a lithium-ion cell which is preferably used in a rechargeable battery according to the invention.

FIG. 11 shows, schematically, a diagram with discharge curves 710, 720, 730, 740 and 750 for the lithium-ion cell at different temperatures.

Figure 12:
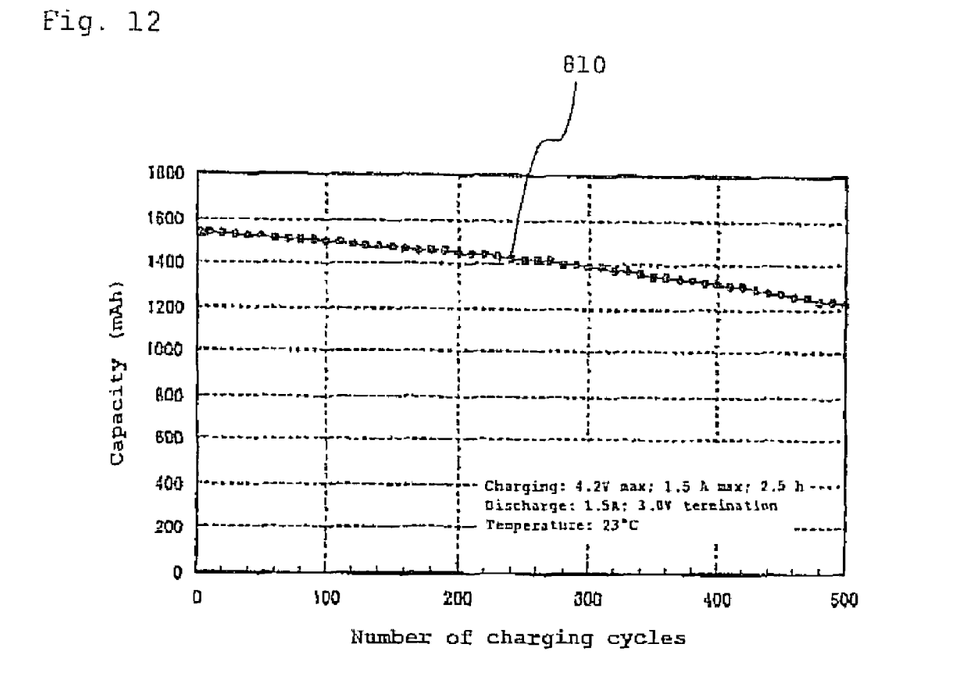
FIG. 12 shows, schematically, a diagram of the capacity of a lithium-ion cell, which is preferably used in a rechargeable battery according to the invention, as a function of the charging cycles for a discharge current of 1.5 A.
Figure 13:
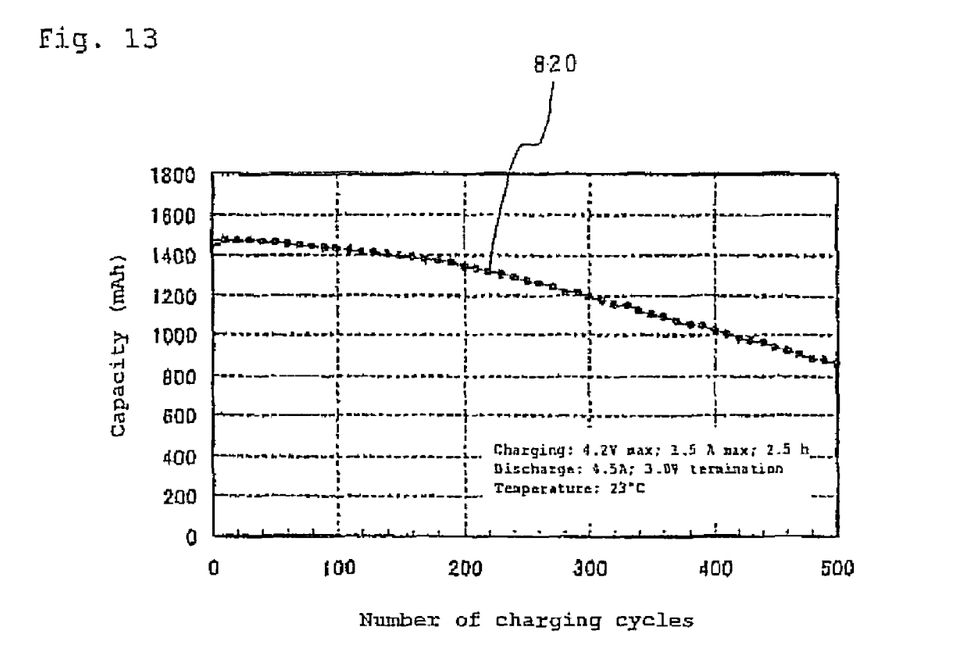
FIG. 13 shows, schematically a diagram of the capacity of a lithium-ion cell, which is preferably used in a rechargeable battery according to the invention, as a function of the charging cycles for a discharge current of 4.5 A.

FIG. 12 shows, schematically, a diagram of the capacity 810 of the lithium-ion cell as a function of the number of charging cycles for a discharge current of 1.5 A. FIG. 13 shows in a corresponding form, a schematic diagram of the capacity 820 of the lithium-ion cell as a function of the number of charging cycles for a discharge current of 4.5 A.

LIST OF REFERENCE SYMBOLS

10 Rechargeable-battery voltage
20 External voltage
30 Output voltage
40 Reference voltage
52 First comparator
54 Second comparator
62 First delay element
64 Second delay element
70 Discharge switch
80 Charging circuit
90 Energy store
102 Rechargeable battery
104, 104' Extendable rechargeable battery
106 Rechargeable battery with wear indication
110 Lithium-ion cell
120 Electronics assembly
130 Connecting plug
132, 134 Connecting contact for inputting or outputting electrical energy
136 Communication interface
141 Connecting socket
142, 144 Connecting contacts for inputting or outputting electrical energy 146 Communication interface
150 Electronics assembly
210 Output voltage of the rechargeable battery
220 External voltage
230 Switching state of the discharge switch
240 Switching state of the charging switch
300 State of charge indication
310 Light-emitting diode
320 Switch
330 Light-emitting diode for wear indication
410 Charging voltage
420 Charge capacity
430 Charging current
510, 520 Discharge capacity
610-650 Discharge curves
710-750 Discharge curves
810, 820 Capacity
901-906 Resistors R1 to R6
910 Comparator
915 Line
920 Comparison voltage
925 Circuit or integrated circuit
930 Inverter
940, 941 MOSFET
950 Transistor
960 Relay
970, 971 Diode
980 Power supply unit
t1-t6 Times
T1, T2 Delay times

What is claimed is:

1. A rechargeable battery for operation with an external voltage which is applied at least at times to the output of the rechargeable battery and is below the output voltage of the rechargeable battery when in its fully charged state, comprising
at least one chargeable electrochemical cell,
an electrical connection to the output of the rechargeable-battery for inputting and/or outputting electrical energy,
a housing which surrounds the at least one chargeable electrochemical cell, and
a control circuit for controlling the charging process of the rechargeable battery and/or the production of the rechargeable-battery voltage at the output of the rechargeable battery, the control circuit being adapted to disconnect the rechargeable-battery voltage from the output of the rechargeable battery at cyclic time intervals in order to check whether the external voltage is applied to the output of the rechargeable battery.

2. The rechargeable battery as claimed in claim 1, wherein the external voltage which is applied at least at times to the output of the rechargeable battery is provided by a power supply unit which is connected to an electrical power supply system at least at times.

3. The rechargeable battery as claimed in claim 1, wherein the control circuit is arranged within the housing.

4. The rechargeable battery as claimed in claim 1, wherein the control circuit has a controllable switch for production of the rechargeable-battery voltage at the output of the rechargeable battery.

5. The rechargeable battery as claimed in claim 1, wherein the control circuit has a controllable charging circuit for charging the rechargeable battery.

6. The rechargeable battery as claimed in claim 5, wherein the charging circuit has a voltage converter.

7. The rechargeable battery as claimed in claim 1, wherein the control circuit has at least one comparator which is designed to compare the voltage at the output of the rechargeable battery with a reference voltage.

8. The rechargeable battery as claimed in claim 7, wherein the at least one comparator is designed to drive the controllable switch and/or the controllable charging circuit.

9. The rechargeable battery as claimed in claim 1, wherein the control circuit is designed to produce the rechargeable-battery voltage at the output of the rechargeable battery on identification of a voltage at the output of the rechargeable battery which is below the reference voltage, and to interrupt the charging process of the rechargeable battery by the charging circuit.

10. The rechargeable battery as claimed in claim 1, wherein the control circuit is designed to disconnect the rechargeable-battery voltage from the output of the rechargeable battery on identification of a voltage at the output of the rechargeable battery which is above the reference voltage, and to carry out the charging process of the rechargeable battery by means of the charging circuit.

11. The rechargeable battery as claimed in claim 1, furthermore having at least one timer which is connected between the at least one comparator and the controllable switch and/or the controllable charging circuit, and that is designed to delay the control signal for the comparator by a predetermined delay time.

12. The rechargeable battery as claimed in claim 1, wherein the control circuit has an energy store for storage of electrical energy.

13. The rechargeable battery as claimed in claim 1, having at least two series-connected and/or at least two parallel-connected cells.

14. A method for operation of a rechargeable battery with a rechargeable-battery voltage which is applied switchably to the output of the rechargeable battery, and with an external voltage which is applied at least at times to the output of the rechargeable battery and is below the rechargeable-battery voltage when the rechargeable battery is fully charged, the method comprising:
monitoring the voltage at the output of the rechargeable battery,
producing the rechargeable-battery voltage at the output of the rechargeable battery as a function of the monitored voltage,
charging the rechargeable battery by the external voltage, which is applied to the output of the rechargeable battery, as a function of the monitored voltage, and
disconnecting the rechargeable-battery voltage from the output of the rechargeable battery at cyclic time intervals in order to check whether the external voltage is applied to the output of the rechargeable battery.

15. The method as claimed in claim 14, wherein the process of monitoring the voltage at the output of the rechargeable battery comprises comparison with a predetermined reference voltage.

16. The method as claimed in claim 15, wherein the rechargeable-battery voltage is produced at the output of the rechargeable battery, and the charging of the rechargeable battery is interrupted when the monitored voltage falls below a predetermined reference value.

17. The method as claimed in claim 14, wherein the rechargeable battery is charged when the monitored voltage is above a predetermined reference value over a predetermined time period.

18. The method as claimed in claim 16, wherein the predetermined reference value is below the voltage value of the external voltage.

19. The method as claimed in claim 14, wherein the process of charging the rechargeable battery by means of the external voltage which is applied to the output of the rechargeable battery comprises the conversion of a voltage.

20. The method as claimed in claim 14, further comprising storing electrical energy in an energy store.

21. The method as claimed in claim 14, wherein the external voltage which is applied to the output of the rechargeable battery at least at times is produced by a power supply unit which is connected to an electrical power supply system, at least at times.

22. The method as claimed in claim 14, wherein switching takes place automatically from at least one first rechargeable battery to at least one second rechargeable battery.

23. The rechargeable battery as claimed in claim 1, wherein the at least one chargeable electrochemical cell comprises at least one lithium-ion cell, wherein the housing surrounds the at least one lithium-ion cell, and wherein the rechargeable battery further comprises:
a communication interface for communication between the rechargeable battery and a load to be supplied, which communication interface is matched to the characteristics of the at least one lithium-ion cell, wherein the at least one lithium-ion cell is suitable for operation without a protection circuit.

24. The rechargeable battery as claimed in claim 23, wherein at least one electrode of the lithium-ion cell is composed of manganese.

25. The rechargeable battery as claimed in claim 23, wherein the positive electrode of the lithium-ion cell has a nickel/manganese mixture.

26. The rechargeable battery as claimed in claim 23, having at least two series-connected and/or at least two parallel-connected lithium-ion cells.

27. The rechargeable battery as claimed in claim 23, wherein the at least one lithium-ion cell complies with the UL1642 safety standard.

28. The rechargeable battery as claimed in claim 23, wherein the at least one lithium-ion cell is suitable for discharging in an operating temperature range from at least 0° to 40° C.

29. The rechargeable battery as claimed in claim 23, wherein the at least one lithium-ion cell is suitable for charging in an operating temperature range from at least 10° to 40° C.

30. The rechargeable battery as claimed in claim 23, wherein the at least one lithium-ion cell is resistant to vibration in accordance with EN1789.

31. The rechargeable battery as claimed in claim 23, wherein the at least one lithium-ion cell has an initial capacity of at least 1400 mAh.

32. The rechargeable battery as claimed in claim 23, wherein the at least one lithium-ion cell has a capacity of at least 60% of the initial capacity after about 500 charging cycles with an average discharge current of 1.5 A and with the rechargeable battery being discharged at about 3 V.

33. The rechargeable battery as claimed in claim 23, wherein the at least one lithium-ion cell has a capacity of at least 40% of the initial capacity after about 500 charging cycles with an average discharge current of 4.5 A and with the rechargeable battery being discharged at about 3 V.

34. The rechargeable battery as claimed in claim 23, wherein the at least one lithium-ion cell has a maximum discharge current of at least 10 A.

35. The rechargeable battery as claimed in claim 23, further comprising a wear indication which generates a visual indication as a function of the charging cycles of the rechargeable battery.

36. The rechargeable battery as claimed in claim 23, further comprising at least one power supply unit which is integrated in the housing.

37. The rechargeable battery as claimed in claim 23, characterized in that the surface of the housing has a signal color, at least in places.

38. The rechargeable battery as claimed in claim 23, characterized in that the surface of the housing has a fluorescent color, at least in places.

39. The rechargeable battery as claimed in claim 23, having at least one light source which emits light preferably continuously and/or in pulses.

40. The rechargeable battery as claimed in claim 23, having at least one sound source which has means for detection of an acoustic signal.

41. A rechargeable-battery arrangement comprising:
a first rechargeable battery and a second rechargeable battery, each battery as claimed in claim 1,
a connection for inputting and/or outputting electrical energy, electrically connected to at least one of the first and second chargeable batteries, and
an electronics assembly which is designed to discharge the second rechargeable battery during discharging of the rechargeable-battery arrangement only when the first rechargeable battery has been completely discharged.

42. The rechargeable-battery arrangement as claimed in claim 41 having means for automatically switching from the first rechargeable battery to the second rechargeable battery.

43. A medical appliance comprising a rechargeable-battery arrangement as claimed in claim 41.

44. The medical appliance as claimed in claim 43, furthermore having an integrated power supply unit connectable to an electrical power supply system.

45. The medical appliance as claimed in claim 43, having means for automatically switching from the first rechargeable battery to the second rechargeable battery.

46. The medical appliance as claimed in claim 43, characterized in that one housing surface has a signal color, at least in places.

47. The medical appliance as claimed claim 43, characterized in that one housing surface has a fluorescent color, at least in places.

48. The medical appliance as claimed in claim 43, having at least one light source which emits light continuously and/or in pulses.

49. The medical appliance as claimed in claim 43, having at least one sound source which has means for detection of an acoustic signal.

50. A charger which is designed to charge at least one rechargeable battery as claimed in claim 1.

51. A method for monitoring heart functions, comprising utilizing a medical appliance that has a rechargeable battery as claimed in claim 1.

52. The method of claim 51, wherein the medical appliance is situated in a rescue vehicle.

* * * * *